US011171519B2

(12) United States Patent
Byun et al.

(10) Patent No.: US 11,171,519 B2
(45) Date of Patent: Nov. 9, 2021

(54) POWER TRANSMITTING AND RECEIVING APPARATUS AND METHOD FOR PERFORMING A WIRELESS MULTI-POWER TRANSMISSION

(71) Applicant: Samsung Electronics Co., Ltd., Gyeonggi-do (KR)

(72) Inventors: Kang-Ho Byun, Gyeonggi-do (KR); Kyung-Woo Lee, Gyeonggi-do (KR); Young-Min Lee, Gyeonggi-do (KR); Se-Ho Park, Gyeonggi-do (KR); Yu-Su Kim, Gyeonggi-do (KR); Sung-Ku Yeo, Gyeonggi-do (KR)

(73) Assignee: Samsung Electronics Co., Ltd ( * ) Notice: Subject to any disclaimer, the term of this patent is extended or adjusted under 35 U.S.C. 154(b) by 315 days.

(21) Appl. No.: 15/678,682

(22) Filed: Aug. 16, 2017

(65) Prior Publication Data
US 2017/0346332 A1 Nov. 30, 2017

Related U.S. Application Data

(63) Continuation of application No. 13/474,338, filed on May 17, 2012, now Pat. No. 9,762,079.

(30) Foreign Application Priority Data

May 17, 2011 (KR) .................. 10-2011-0046445
May 15, 2012 (KR) .................. 10-2012-0051506

(51) Int. Cl.
*H02J 7/02* (2016.01)
*H02J 7/00* (2006.01)
(Continued)

(52) U.S. Cl.
CPC .............. *H02J 50/40* (2016.02); *H02J 50/12* (2016.02); *H02J 50/80* (2016.02); *H02J 7/00036* (2020.01)

(58) Field of Classification Search
CPC .. H02J 7/025; H02J 50/40; H02J 50/12; H02J 50/80; H02J 7/0004; H02J 7/02; H02J 7/00; H02J 5/00
See application file for complete search history.

(56) References Cited

U.S. PATENT DOCUMENTS 8,102,147 B2   1/2012  Jung
9,127,204 B2   9/2015  Yun
(Continued)

FOREIGN PATENT DOCUMENTS

GB   2472700        2/2011
JP   2009-251895    10/2009
(Continued)

OTHER PUBLICATIONS

Korean Office Action dated Nov. 29, 2018 issued in counterpart application No. 10-2012-0051820, 7 pages.
(Continued)

*Primary Examiner* — Toan T Vu
*Assistant Examiner* — Elim Ortiz

(57) ABSTRACT

A method and an apparatus for wireless power transmission by a power transmitting apparatus is provided. The method includes transmitting detection power towards a power receiving apparatus, detecting an impedance change made by the power receiving apparatus, transmitting driving power for communication with the power receiving apparatus towards the power receiving apparatus, receiving a search signal from the power receiving apparatus within a preset time, and determining whether the impedance change is within a first acceptable range based on the received search signal.

10 Claims, 8 Drawing Sheets

(51) Int. Cl.
*H02J 5/00* (2016.01)
*H02J 50/40* (2016.01)
*H02J 50/80* (2016.01)
*H02J 50/12* (2016.01)

(56) References Cited

U.S. PATENT DOCUMENTS

| | | | |
|---|---|---|---|
| 2007/0021140 A1 | 1/2007 | Keyes, IV | |
| 2007/0042729 A1 | 2/2007 | Baarman | |
| 2007/0139000 A1 | 6/2007 | Kozuma | |
| 2008/0174267 A1 | 7/2008 | Onishi et al. | |
| 2008/0197802 A1 | 8/2008 | Onishi et al. | |
| 2009/0096413 A1 | 4/2009 | Partovi | |
| 2009/0251008 A1 | 10/2009 | Sugaya | |
| 2009/0271048 A1* | 10/2009 | Wakamatsu | H02J 5/005 700/296 |
| 2009/0322158 A1 | 12/2009 | Stevens | |
| 2010/0142423 A1 | 6/2010 | Zhu et al. | |
| 2011/0025264 A1* | 2/2011 | Mochida | H01M 10/425 320/108 |
| 2011/0078092 A1 | 3/2011 | Kim et al. | |
| 2011/0081857 A1 | 4/2011 | Lee et al. | |
| 2011/0248674 A1 | 10/2011 | Baarman | |
| 2012/0001485 A1 | 1/2012 | Uchida | |
| 2012/0007549 A1 | 1/2012 | Murayama | |
| 2014/0035391 A1 | 2/2014 | Kitani | |
| 2015/0091379 A1 | 4/2015 | Uchida | |

FOREIGN PATENT DOCUMENTS

| | | |
|---|---|---|
| JP | 2009-261156 | 11/2009 |
| KR | 100913558 | 8/2009 |
| KR | 1020100066339 | 6/2010 |
| KR | 100971734 | 7/2010 |
| KR | 1020110033692 | 3/2011 |
| WO | WO 2010/116441 | 10/2010 |

OTHER PUBLICATIONS

European Search Report dated Feb. 2, 2015 issued in counterpart application No. 12785104.6-1804.

* cited by examiner

| NETWORK ID | ID | REFERENCE LOAD | REFERENCE CURRENT | REFERENCE VOLTAGE | REFERENCE EFFICIENCY | STATE | INPUT VOLTAGE | INPUT CURRENT | OUTPUT VOLTAGE | OUTPUT CURRENT | TRANSMISSION ORDER | PRIORITY |
|---|---|---|---|---|---|---|---|---|---|---|---|---|
| 1 | 0x11111111 | 25 | 300mA | 5V | 75% | POWER TX STANDBY | - | - | 5V | 300mA | 4 | 5 |
| 2 | 0x22222222 | 30 | 500mA | 3V | 70% | POWER TX | 3V | 400mA | 3V | 400mA | 1 | 1 |
| 3 | 0x33333333 | 10 | 100mA | 5V | 80% | POWER TX | 5V | 100mA | 5V | 100mA | 2 | 2 |
| 4 | 0x44444444 | 50 | 500mA | 5V | 75% | POWER TX | 5V | 500mA | 5V | 500mA | 3 | 3 |
| 5 | 0x55555555 | 100 | 500mA | 12V | 75% | POWER TX STANDBY | - | - | 12V | 500mA | 5 | 4 |
| ⋮ | | | | | | | | | | | | |

FIG.9

POWER TRANSMITTING AND RECEIVING APPARATUS AND METHOD FOR PERFORMING A WIRELESS MULTI-POWER TRANSMISSION

PRIORITY

This application is a Continuation Application of, and claims priority under 35 U.S.C. § 120 to, U.S. patent application Ser. No. 13/474,338 filed in the U.S. Patent and Trademark Office on May 17, 2012, which claims priority under 35 U.S.C. § 119(a) to Korean Patent Application Serial Nos. 10-2011-0046445 and 10-2012-0051506, which were filed in the Korean Intellectual Property Office on May 17, 2011 and May 15, 2012, respectively, the entire content of each of which is incorporated herein by reference.

BACKGROUND OF THE INVENTION

1. Field of the Invention

The present invention relates generally to a method and an apparatus for transmitting and receiving power, and more particularly, to a method and an apparatus for performing wireless multi-power transmissions between a plurality of power receiving apparatuses and a power transmitting apparatus.

2. Description of the Related Art

A conventional power transmitting apparatus and power receiving apparatus perform an initial setup for wireless power transmission, and thereafter, power transmission and reception is performed between the power transmitting apparatus and power receiving apparatus having completed the initial setup.

In general, to perform wireless power charging, a power receiving apparatus performs an authentication with a power transmitting apparatus, and upon successful authentication, receives wireless power from the power transmitting apparatus. When the charging is completed, the power receiving apparatus transmits a charging completion message to the power transmitting apparatus, indicating that the charging is completed. Upon receiving the charging completion message, the power transmitting apparatus stops transmitting power to the power receiving apparatus.

Thereafter, the power transmitting apparatus transmits a recharging identification message, which identifies whether the power receiving apparatus performs recharging, to the power receiving apparatus, based on a regular time interval.

Upon receiving the recharging identification message, the power receiving apparatus generates a recharging request message for requesting recharging, if recharging is needed, and transmits the generated recharging request message to the power transmitting apparatus. Thereafter, the power receiving apparatus receives wireless power for charging from the power transmitting apparatus.

If recharging is not needed, the power receiving apparatus may ignore the received recharging identification message or transmit a recharging rejection message, which indicates that the power receiving apparatus does not want to perform recharging.

However, the above-described convention procedure is problematic when the wireless power transmission is performed between the power transmitting apparatus and multiple power receiving apparatuses, as it does not take into account conditions of power receiving apparatuses or resource limitations of the power transmitting apparatus, e.g., whether the power transmitting apparatus can perform the wireless power transmission with each of the multiple power receiving apparatuses, nor does it provide a protocol for when the power transmitting apparatus cannot perform the wireless power transmission with each of the multiple power receiving apparatuses.

SUMMARY OF THE INVENTION

The present invention is designed to address at least the problems and/or disadvantages described above and to provide at least the advantages described below.

Accordingly, an aspect of the present invention is to provide an apparatus and a method for performing wireless power transmission with a plurality of power receiving apparatuses in consideration of conditions of the plurality of power receiving apparatuses.

In accordance with an aspect of the present invention, a method for wireless power transmission by a power transmitting apparatus is provided. The method includes transmitting detection power towards a power receiving apparatus, detecting an impedance change made by the power receiving apparatus, transmitting driving power for communication with the power receiving apparatus towards the power receiving apparatus, receiving a search signal from the power receiving apparatus within a preset time, and determining whether the impedance change is within a first acceptable range based on the received search signal.

In accordance with another aspect of the present invention, a power transmitting apparatus for wireless power transmission is provided. The power transmitting apparatus includes a resonator, a communication unit, and a controller. The controller is configured to at least control to transmit detection power through the resonator towards a power receiving apparatus, detect an impedance change made by the power receiving apparatus, transmit driving power for communication with the power receiving apparatus, through the resonator, towards the power receiving apparatus, receive a search signal from the power receiving apparatus within a preset time, through the communication unit, determine whether the impedance change is within a first acceptable range based on the search signal, and transmit an approval message towards the power receiving apparatus, through the communication unit, based on the impedance change being within the acceptable range.

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 9 illustrates an example of a power receiving apparatus management table according to an embodiment of the present invention.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

According to an embodiment of the present invention, a power transmitting apparatus can stably supply power to a plurality of power receiving apparatuses by determining power transmission states of the plurality of power receiving apparatuses.

Embodiments of the present invention will be described below, wherein a new power receiving apparatus desires to participate in a network while the power transmitting apparatus is performing wireless power transmission with a plurality of power receiving apparatuses.

Figure 1:
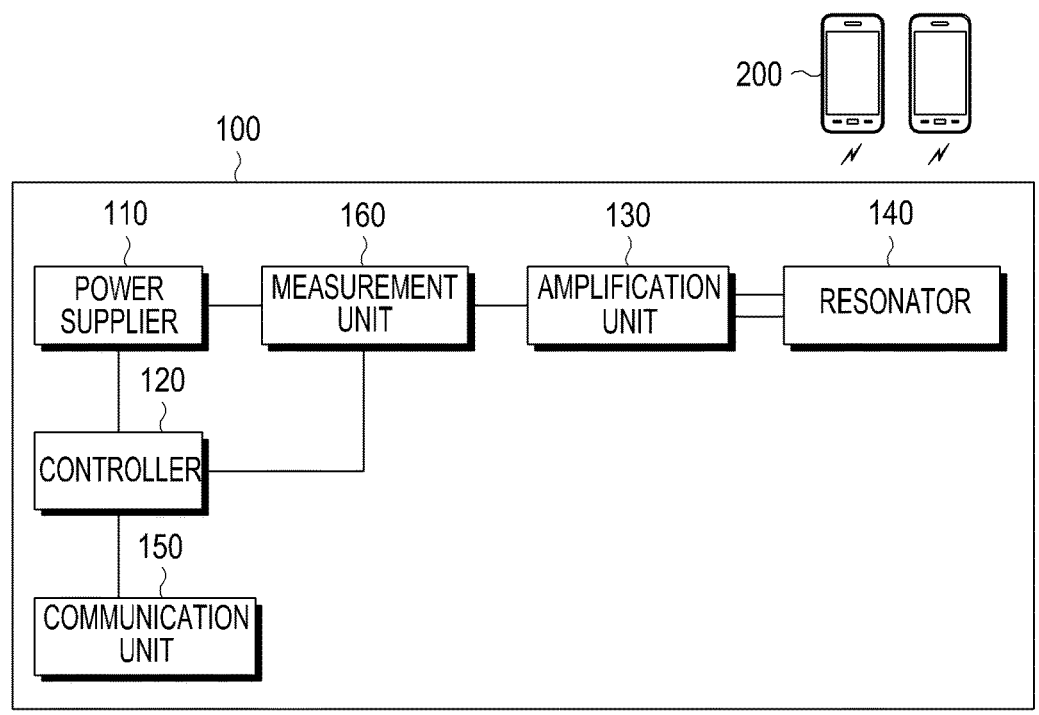
FIG. 1 is a block diagram illustrating a power transmitting apparatus according to an embodiment of the present invention.

FIG. 1 is a block diagram illustrating a power transmitting apparatus according to an embodiment of the present invention.

Referring to FIG. 1, the power transmitting apparatus 100 includes a power supplier 110, a controller 120, an amplification unit 130, a resonator 140, a communication unit 150, and a measurement unit 160.

The power supplier 110 generates power based on a power transmission control value provided by the controller 120.

The controller 120 may include a Central Processing Unit (CPU), a Read Only Memory (ROM) storing a control program for controlling the power transmitting apparatus, and a Random Access Memory (RAM), which stores a signal or data input from an outside of the power transmitting apparatus. Here, the CPU may include a single core, a dual core, a triple core, or a quad core. The CPU, the ROM, and the RAM can be connected with each other through an internal bus. Here, the controller 120 may be referred to as a Main Control Unit (MCU).

The controller 120 controls the power supplier 110, the amplification unit 130, the resonator 140, the communication unit 150, and the measurement unit 160. Particularly, the controller 120 detects the power receiving apparatus 200 and determines whether the detected power receiving apparatus 200 is located in an effective position suitable for receiving wireless power. When the power receiving apparatus 200 is located in the effective position, the controller 120 transmits wireless power for communication to the power receiving apparatus 200. For example, the controller 120 can detect the power receiving apparatus 200 through a change in a load value detected by the resonator 140. The controller 230 calculates a changed load value, and determines that the power receiving apparatus 200 is located in the effective position when the calculated changed load value is larger than a preset threshold and then stores the calculated changed load value.

The controller 120 determines whether a network subscription request message for subscribing to a wireless multi-power transmission network is received from the power receiving apparatus 200 within a preset time. For example, the network subscription request message includes an IDentifier (ID), a protocol version, and a reference load value of the power receiving apparatus 200.

If the network subscription request message is received within the preset time, the controller 120 compares the reference load value contained in the network subscription request message with the changed load value and determines whether the changed load value is within an acceptable range. Here, the controller 120 determines whether the changed load value is within the acceptable range by using a reference load value from the power receiving apparatus 200. That is, the controller 120 determines whether the stored reference load value is within the acceptable range based on the changed load value according to the reference load value of the power receiving apparatus 200.

If the changed load value is within the acceptable range, the controller 120 determines whether the power receiving apparatus 200 having requested a subscription to the network is permitted to subscribe to the wireless multi-power transmission network. Here, the wireless multi-power transmission network refers to a network configured by one transmitting apparatus and a plurality of power receiving apparatuses in order to exchange information for the wireless power transmission.

For example, when the power receiving apparatus 200 has a reference load value of 10Ω, it is assumed that a current increased by 100 mA is measured in the resonator 140 when the power supplier 110 applies a voltage of 12 V. A changed load value may be 100 mA. Thereafter, when a changed load value is measured in the resonator 140 through the measurement unit 160, the controller 120 determines whether the measured changed load value is within a margin of error of 10%. If the measured changed load value is within the margin of error of 10%, the controller 120 may determine that there is the power receiving apparatus 200 with the reference load value of 10Ω. Otherwise, the controller 120 may determine that there are invalid materials.

If the changed load value of the power receiving apparatus 200 exceeds the acceptable range, the controller 120 determines the power receiving apparatus 200 as a non-target apparatus for power, to which the power transmitting apparatus does not transmit power, i.e., invalid materials. The invalid materials refer to other materials for receiving power, which are not the power receiving apparatus 200 to which the power transmitting apparatus 100 desires to transmit wireless power. Such invalid materials include a metal material, an electronic device that does not perform communication with the power transmitting apparatus 100, and a power receiving apparatus 200 to which the power transmitting apparatus does not transmit the wireless power.

Further, when the network subscription request message is not received from the power receiving apparatus 200 within the preset time, the controller 120 identifies the power receiving apparatus 200 as the invalid materials. Thereafter, the controller 120 stops transmitting the power to the power receiving apparatus 200 determined as the non-target apparatus for power.

The controller 120 determines whether the power receiving apparatus 200 having requested the subscription to the wireless multi-power transmission network can subscribe to the wireless multi-power transmission network. If the power receiving apparatus can subscribe to the wireless multi-power transmission network, the controller 120 transmits a network subscription approval message to the power receiving apparatus 200. If the power receiving apparatus 200 cannot subscribe to the wireless multi-power transmission network, the controller 120 transmits a network subscription rejection message to the power receiving apparatus and stops transmitting the wireless power supplied for communication. When a number of power receiving apparatuses in excess of an acceptable number subscribe to the wireless multi-power transmission network or a protocol version of the power receiving apparatus 200 is higher than a protocol version of the wireless multi-power transmission network, the controller 120 can determine that the power receiving apparatus 200 cannot subscribe to the wireless multi-power transmission network.

For example, the network subscription approval message includes communication information used for communication such as a network ID, schedule information, etc. Here, the network ID refers to an inherent ID of the power receiving apparatus 200 within the network used for identifying a plurality of power receiving apparatuses in the wireless multi-power transmission network according to an embodiment of the present invention. The schedule information refers to information for communication in the wireless multi-power transmission network. Further, the network ID may include a session ID.

The controller 120 determines whether a power transmission request message is received from the power receiving apparatus 200 within a preset time. When the power transmission request message is received, the controller 120 determines whether the power can be transmitted to the power receiving apparatus 200. Specifically, the controller 120 calculates a power value required by the power receiving apparatus 200 by using a reference voltage, a reference current, and a reference efficiency value of the power receiving apparatus 200 included in the power transmission request message. Thereafter, the controller 120 determines whether a value generated by adding the power value, which is measured by the measurement unit 160, being transmitted by the power transmitting apparatus 100 and the calculated power value required by the power receiving apparatus 200 is smaller than a maximum output power value of the power transmitting apparatus 100. The maximum output power value of the power transmitting apparatus 100 is a preset value.

If the value generated by adding the power value being transmitted by the power transmitting apparatus 100 and the power value required by the power receiving apparatus 200 is smaller than the maximum output power value of the power transmitting apparatus 100, the controller 120 can determine that the power can be transmitted to the power receiving apparatus 200.

If the power transmission request message is not received, the controller 120 determines that there is no power receiving apparatus 200 and stops transmitting the wireless power supplied for the communication.

Further, when it is determined that the power can be transmitted to the power receiving apparatus 200, the controller 120 transmits a power transmission approval message to the power receiving apparatus 200 and then transmits the requested power to the power receiving apparatus 200. When it is determined that the power cannot be transmitted to the power receiving apparatus 200, the controller 120 transmits a power transmission rejection message to the power receiving apparatus 200 and then stops transmitting the wireless power supplied for the communication.

The controller 120 determines whether a power transmission state message is received from the power receiving apparatus 200 within a preset time. If the power transmission state message is received, the controller 120 stores values for a reception voltage, a reception current, an output voltage, and an output current of the power receiving apparatus 200 included in the power transmission state message in a memory. If the power transmission state message is not received within the preset time, the controller 120 determines that there is no power receiving apparatus and stops transmitting the wireless power supplied for the communication.

The controller 120 renews a power receiving apparatus management table stored in a memory (not shown) by using the power transmission state message received from a plurality of power receiving apparatuses having subscribed to the wireless multi-power transmission network within the preset time. The power receiving apparatus management table will be discussed in more detail below.

The controller 120 can configure power transmission state information on the plurality of power receiving apparatuses having subscribed to the wireless multi-power transmission network in the power receiving apparatus management table and store the configured power receiving apparatus management table in the memory, thereby managing the plurality of power receiving apparatuses. For example, the power transmission state information on the plurality of power receiving apparatuses includes a session ID set by each power receiving apparatus for communication with the power transmitting apparatus, and an ID, a reference load, a reference current, a reference voltage, a reference efficiency, a power transmission state, an input voltage, an input current, an output voltage, an output current, a transmission order, and a priority of each power receiving apparatus. The controller 120 manages power transmission to the plurality of power receiving apparatuses using the power receiving apparatus management table.

The controller 120 calculates a transmission power value, which the power transmitting apparatus 100 desires to transmit to each power receiving apparatus, by using the power transmission state information in the renewed power receiving apparatus management table.

The controller 120 calculates a leakage power value using an output current value, an output voltage value, a transmission power value, and a reference efficiency value of the power receiving apparatus 200 received from the power receiving apparatus 200.

If the calculated leakage power value is within an acceptable range, the controller 120 changes a current transmission power value into the calculated transmission power value and then transmits the changed calculated transmission power value. If the calculated leakage power value is within a preset threshold, it is determined that the calculated leakage power value is within the acceptable range. If the calculated leakage power value exceeds the acceptable range, the controller 120 determines the power receiving apparatus 200 as being the invalid materials and stops transmitting power. Thereafter, the controller 120 changes the power transmission value according to the power transmission state message of the power receiving apparatus 200, until a power transmission completion message is received from the power receiving apparatus 200, so as to continuously perform the wireless power transmission.

When the power transmission completion message is received from the power receiving apparatus, the controller 120 changes a current transmission power value into a power value used by the power receiving apparatus 200 for communication and then transmits the changed power value. For example, in accordance with an embodiment of the present invention, a transmission power value transmitted to a first power receiving apparatus is 3 W, a transmission power value transmitted to a second power receiving apparatus is 4 W, and a power value used by the first power receiving apparatus and the second power receiving apparatus for communication, respectively is 0.1 W. If power transmission to the first power receiving apparatus is completed, the controller 120 transmits the power value of 0.1 W to the first power receiving apparatus and transmits the power value of 4 W to the second power receiving apparatus.

The amplification unit 130 increases the power generated by the power supplier 110 and outputs the increased power. The amplification unit 130 includes an amplifier.

The resonator 140 transmits the power in a resonant frequency, which is controlled under a control of the controller 120 according to the power generated from the amplification unit 130, to the power receiving apparatus 200. For example, the resonator 140 includes a coil or an antenna.

The communication unit 150 performs communication with one or more power receiving apparatuses, which are targets of the charging, and may use any type of wireless short-distance communication scheme. For example, the communication unit 150 includes a communication Integrated Circuit (IC).

The measurement unit 160 measures the power generated from the power supplier 110 and transfers a transmission power value of the power transmitting apparatus 100 to the controller 110.

As described above, the power transmitting apparatus according to an embodiment of the present invention can stably transmit power to each power receiving apparatus by considering power transmission states of a plurality of power receiving apparatuses.

Figure 2:
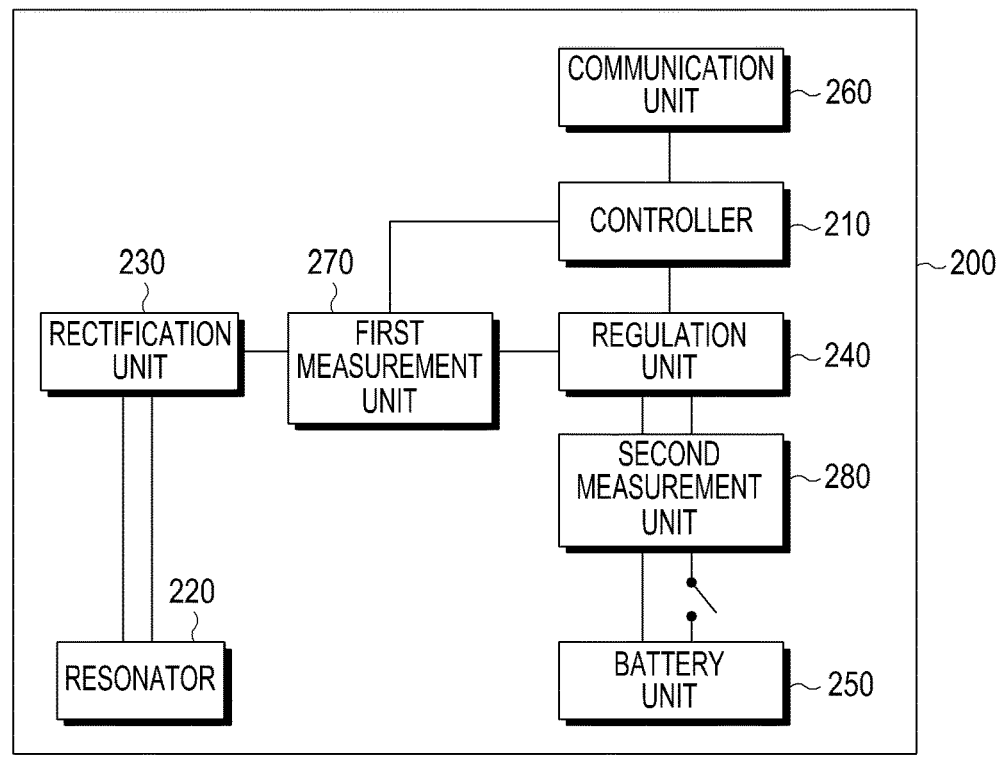
FIG. 2 is a block diagram illustrating a power receiving apparatus according to an embodiment of the present invention.

FIG. 2 is a block diagram illustrating a power receiving apparatus according to embodiments of the present invention.

Referring to FIG. 2, the power receiving apparatus 200 includes a controller 210, a resonator 220, a rectification unit 230, a regulation unit 240, a battery unit 250, a communication unit 260, a first measurement unit 270, and a second measurement unit 280.

The controller 210 controls operations of the resonator 220, the rectification unit 230, the regulation unit 240, the battery unit 250, and the communication unit 260. Particularly, when power is received, the controller 210 generates the network subscription request message including the ID, the protocol version, and the reference load value of the power receiving apparatus 200 and then transmits the generated network subscription request message to the power transmitting apparatus for the subscription to the wireless multi-power transmission network. Here, the ID of the power receiving apparatus can be used for determining a specification of the power receiving apparatus as well as identifying the power receiving apparatus. Further, the protocol version is used for grasping if communication is possible in the wireless multi-power transmission network, and the reference load value is used for detecting invalid materials or identifying a location of the power receiving apparatus 200, etc.

The controller 210 determines whether the network subscription approval message is received from the power transmitting apparatus within the preset time. When the network subscription approval message is received, the controller 210 transmits the power transmission request message for receiving wireless power from the power transmitting apparatus to the power transmitting apparatus.

If the network subscription rejection message is received from the power transmitting apparatus within the preset time or no message is received, the controller 210 retransmits the network subscription request message to the power transmitting apparatus.

Thereafter, the controller 210 determines whether the power transmission approval message is received from the power transmitting apparatus within the preset time. When the power transmission approval message is received, the controller 210 supplies power to the battery unit 250 by turning on a switch of an output terminal and measures a reception voltage, a reception current, an output voltage, and an output current of the output terminal. Here, the output terminal is located between the regulation unit 240 and the battery unit 250.

The controller 210 generates the power transmission state message including the measured output voltage, output current, measured reception voltage, and reception current, and periodically transmits the generated power transmission state message to the power transmitting apparatus.

If the power transmission approval message is not received within the preset time or the power transmission rejection message is received from the power transmitting apparatus, the controller 210 enters a power reception standby state. That is, the controller 210 supplies power to the battery unit 250 by turning on the switch of the output terminal and stops transmitting the power to the battery unit 250 after measuring the output voltage and the output current of the output terminal in the power reception standby state. Subsequently, the controller 210 transmits a power transmission standby state message including the measured output voltage and output current to the power transmitting apparatus.

When the power reception is completed, the controller 210 stops supplying power to the battery unit 250 by turning off the switch of the output terminal, generates the power transmission completion message for indicating that power transmission has been completed, and then transmits the generated power transmission completion message to the power transmitting apparatus. Thereafter, the controller 210 enters the power reception standby state.

The controller supplies power to the battery unit by turning on the switch of the output terminal and stops transmitting the power to the battery unit after measuring the output voltage and the output current of the output terminal in the power reception standby state. Thereafter, the controller 210 transmits the power transmission standby state message including the measured output voltage and output current to the power transmitting apparatus.

The controller 210 determines whether the power reception is completed. If the power reception is completed, the controller 210 periodically transmits the power transmission standby state message to the power transmitting apparatus and maintains a communication connection with the power transmitting apparatus. If the power reception is not completed, controller 210 waits for receiving the power transmission approval message during the preset time.

The resonator 220 receives wireless power from the resonator 140 of the power transmitting apparatus and then outputs the received wireless power. The wireless power refers to an Alternating Current (AC) power signal. For example, the resonator 220 includes a coil or an antenna.

The rectification unit 230 converts the received AC power signal to a Direct Current (DC) power signal. The rectification unit 230 includes a rectifier.

The regulation unit 240 regulates a power amount charged to the battery unit 250 for continuously maintaining a value set in the controller 210. The regulation unit 240 includes a regulator.

The battery unit 250 stores the wireless power regulated by the regulation unit 240. In accordance with different embodiments of the present invention, the battery unit 250 may be a battery unit of a device equipped with the power receiving apparatus 200 or may be replaced with the device equipped with the power receiving apparatus 200. The battery unit 250 includes a battery.

The communication unit 260 performs communication with the power transmitting apparatus. Accordingly, the communication unit 260 uses any suitable type of wireless short-distance communication scheme. The communication unit 260 includes a communication IC.

The first measurement unit 270 measures voltage or current information rectified through the rectification unit 230, and the second measurement unit 280 measures voltage or current information input to the battery unit 250.

As described above, a power transmitting apparatus according to an embodiment of the present invention, can stably transmit power to each power receiving apparatus by considering power transmission states of a plurality of power receiving apparatuses.

Figure 3:
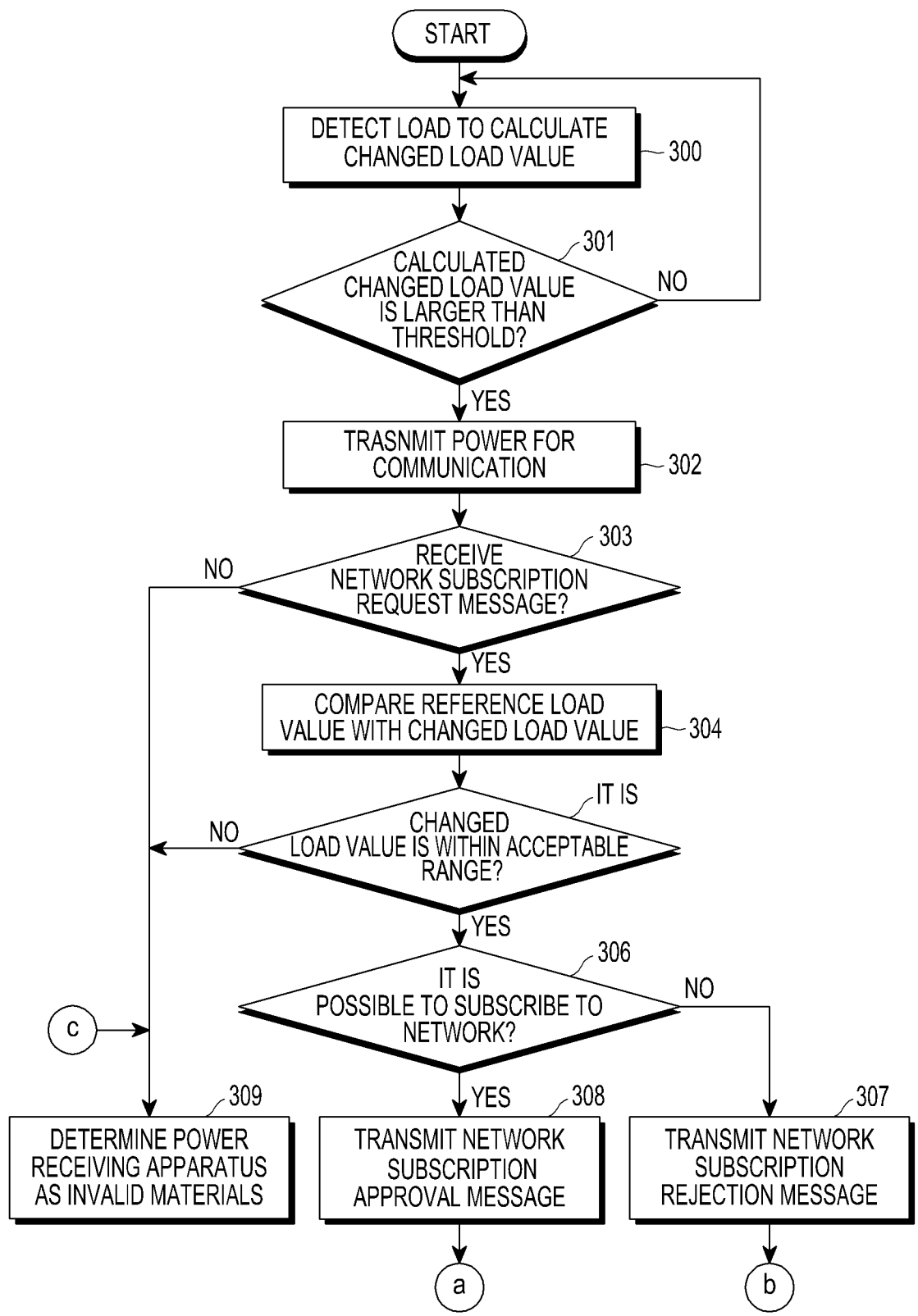
FIGS. 3 to 5 are flowcharts illustrating a process in which a power transmitting apparatus manages a plurality of power receiving apparatuses in performing wireless power transmission according to an embodiment of the present invention.
Figure 4:
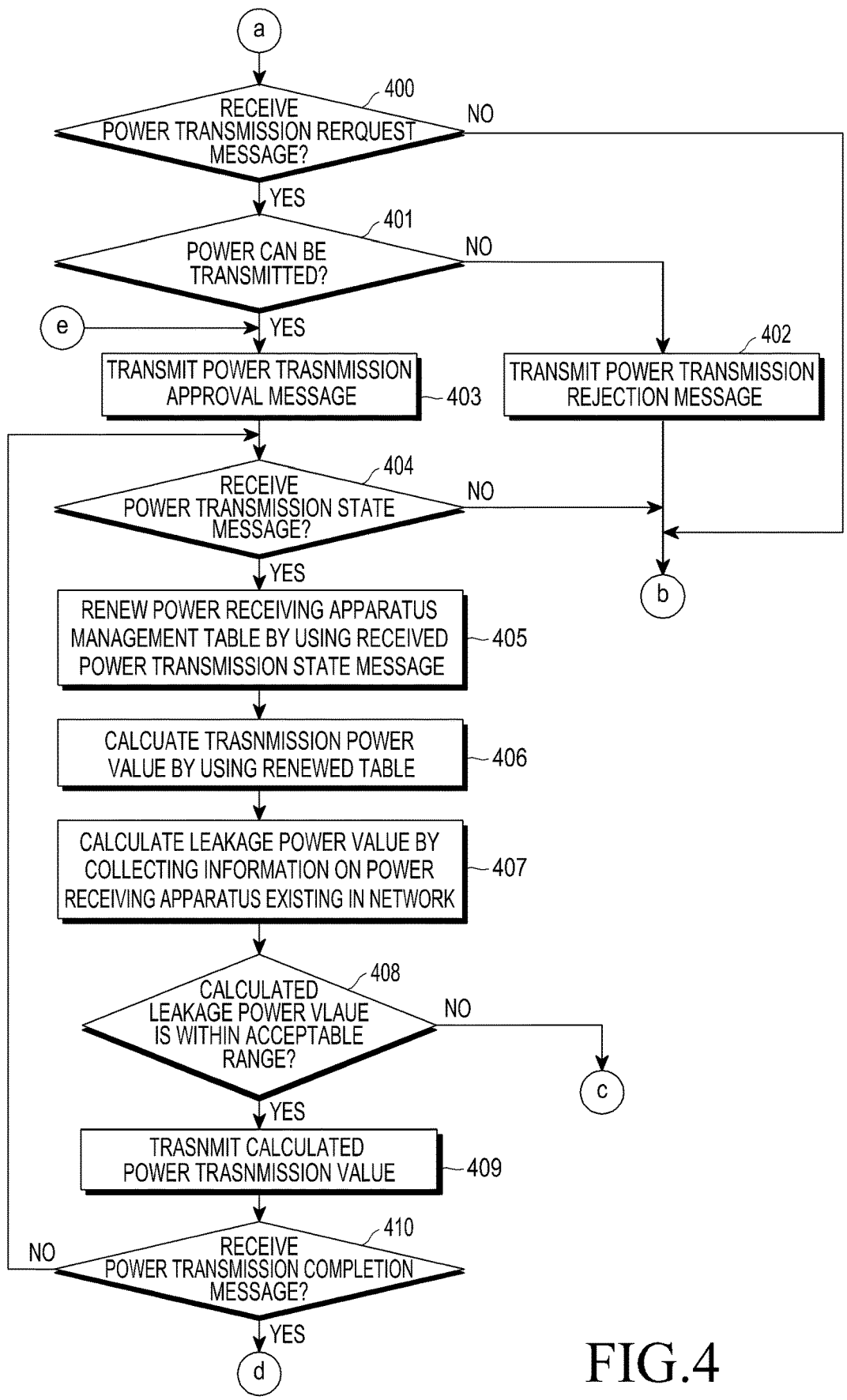
Figure 5:
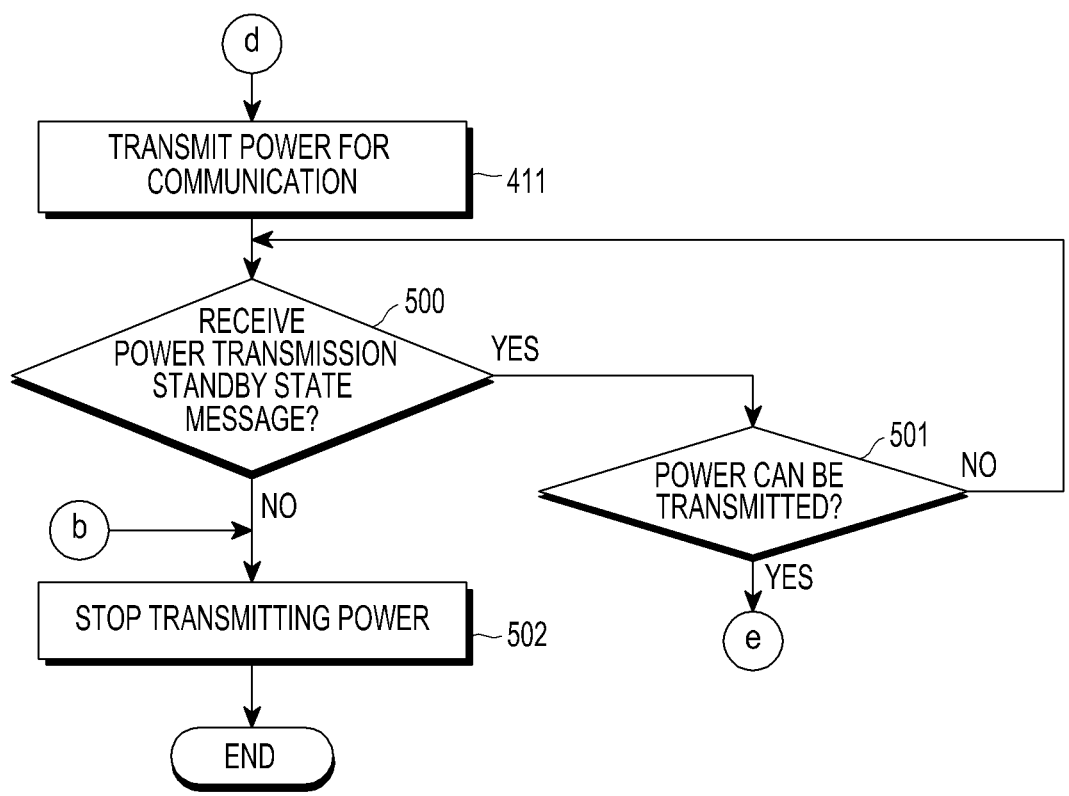

FIGS. 3 to 5 are flowcharts illustrating a process in which a power transmitting apparatus manages a plurality of power receiving apparatuses in performing wireless power transmission according to an embodiment of the present invention.

Referring to FIG. 3, the controller 120 detects loads of the resonator 140 and calculates the changed load value in step 300. Specifically, the controller 120 detects the power receiving apparatus 200 through the changed load value detected by the resonator 140.

In step 301, the controller 120 determines whether the calculated changed load value is larger than a preset threshold. When the calculated changed load value is larger than the preset threshold, the controller 120 transmits power for communication with the power receiving apparatus 200 to the power receiving apparatus 200 in step 302.

However, when the calculated changed load value is not larger than the preset threshold, step 300 is performed again, and thus, the changed load value is calculated and stored.

In step 303, the controller 120 determines whether a network subscription request message for the subscription to the wireless multi-power transmission network is received from the power receiving apparatus 200 within the preset time. If the network subscription request message is received within the preset time, the controller 120 compares the reference load value contained in the network subscription request message with the changed load value in step 304.

However, if the network subscription request message is not received within the preset time, the controller 120 determines the detected power receiving apparatus as invalid materials in step 309.

In step 305, the controller 120 determines whether the changed load value is within an acceptable range.

When the reference load value is not within the acceptable range, the detected power receiving apparatus is determined as the invalid materials in step 309.

When the reference load value is within the acceptable range, the controller 120 determines whether the power receiving apparatus can subscribe to the wireless multi-power transmission network in step 306.

If the power receiving apparatus can subscribe to the wireless multi-power transmission network, the controller 120 transmits the network subscription approval message to the power receiving apparatus in step 308.

If the power receiving apparatus cannot subscribe to the wireless multi-power transmission network in step 303, the controller 120 transmits the network subscription rejection message to the power receiving apparatus in step 307. Referring to FIG. 5, the controller 120 then stops transmitting the wireless power supplied for communication in step 502.

Referring to FIG. 4, the controller 120 determines whether the power transmitting request message is received from the power receiving apparatus within the preset time in step 400.

When the power transmitting request message is received the controller 120 determines whether the power can be transmitted to the power receiving apparatus in step 401. Specifically, the controller 120 calculates the power value required by the power receiving apparatus 200 by using the reference voltage value, the reference current value, and the reference efficiency value included in the power transmission request message. The controller 120 then determines whether the value generated by adding the power value being transmitted by the power transmitting apparatus and the calculated power value required by the power receiving apparatus 200 is smaller than the maximum output power value of the power transmitting apparatus. If the value generated by adding the power value being transmitted by the power transmitting apparatus and the calculated power value required by the power receiving apparatus 200 is smaller than the maximum output power value of the power transmitting apparatus, the controller 120 determines that the power can be transmitted to the power receiving apparatus 200.

If the power transmission request message is not received in step 400, the controller 120 determines that there is no power receiving apparatus and stops transmitting the wireless power supplied for communication in step 502 of FIG. 5.

If the power can be transmitted in step 401, the controller 120 transmits the power transmission approval message to the power receiving apparatus 200 in step 403. Thereafter, the controller 120 transmits the requested wireless power to the power receiving apparatus.

If the power cannot be transmitted in step 401, the controller 120 transmits the power transmission rejection message to the power receiving apparatus in step 402. The controller 120 then stops transmitting the wireless power supplied for communication in step 502 of FIG. 5.

In step 404, the controller 120 determines whether the power transmission state message is received from the power receiving apparatus within the preset time.

If the power transmission state message is received, the controller 120 renews the power receiving apparatus management table by using the received power transmission state message in step 405. Specifically, the controller 120 renews the power receiving apparatus management table stored in the memory by using the values of the reception voltage, the reception current, the output voltage, and the output current of the power receiving apparatus contained in the power transmission state message.

If the power transmission state message is not received in step 404, the controller 120 determines that there is no power receiving apparatus and stops transmitting the wireless power supplied for communication in step 502 of FIG. 5.

In step 406, the controller 120 calculates the transmission power value, which the power transmitting apparatus desires to transmit to the power receiving apparatus 200, by using the renewed power receiving apparatus management table.

In step 407, the controller 120 calculates the leakage power value by collecting information on the power receiving apparatus 200 existing in the network. Specifically, the controller 120 calculates the leakage power value using the values for the output current and the output voltage of the power receiving apparatus 200, the transmission power value, and the reference efficiency value of each power receiving apparatus, the values being received from the power receiving apparatus 200. For example, when the transmission power value of the power transmitting apparatus is 10 W and a total of power values received according to the reference efficiency value of each power receiving apparatus 200 is 8 W, the leakage power value is 2 W.

In step 408, the controller 120 determines whether the calculated leakage power value is within the acceptable range. That is, if the calculated leakage power value is within the preset threshold, the controller 120 determines that the leakage power value is within the acceptable range.

When the calculated leakage power value is within the acceptable range, the controller 120 transmits the calculated power transmission value to the power receiving apparatus in step 409. The calculated power transmission value is converted from the current transmission power value.

However, when the calculated leakage power value is not within the acceptable range, the detected power receiving apparatus is determined as invalid materials in step 309 of FIG. 3.

In step 410, the controller 120 determines whether the power transmission completion message is received from the power receiving apparatus.

When the power transmission completion message is not received, the controller 120 continuously determines whether the power transmission state message is received in step 404.

However, when the power transmission completion message is received, the controller 120 converts the transmission power value into the power value used for performing communication by the power receiving apparatus 200 and then transmits the converted transmission power value in step 411.

In step 500, the controller 120 determines whether the power transmission standby state message is received.

When the power transmission standby state message is not received, the controller 120 stops transmitting the wireless power supplied for communication in step 502.

However, when the power transmission standby state message is received in step 500, the controller 120 determines whether the power can be transmitted to the power receiving apparatus in step 501.

When the power can be transmitted, s the power transmission approval message is transmitted to the power receiving apparatus in step 403, and steps 404 to 411 are subsequently performed.

However, if the power cannot be transmitted in step 501, the controller 120 continuously determines whether the power transmission standby state message is received in step 500.

Figure 6:
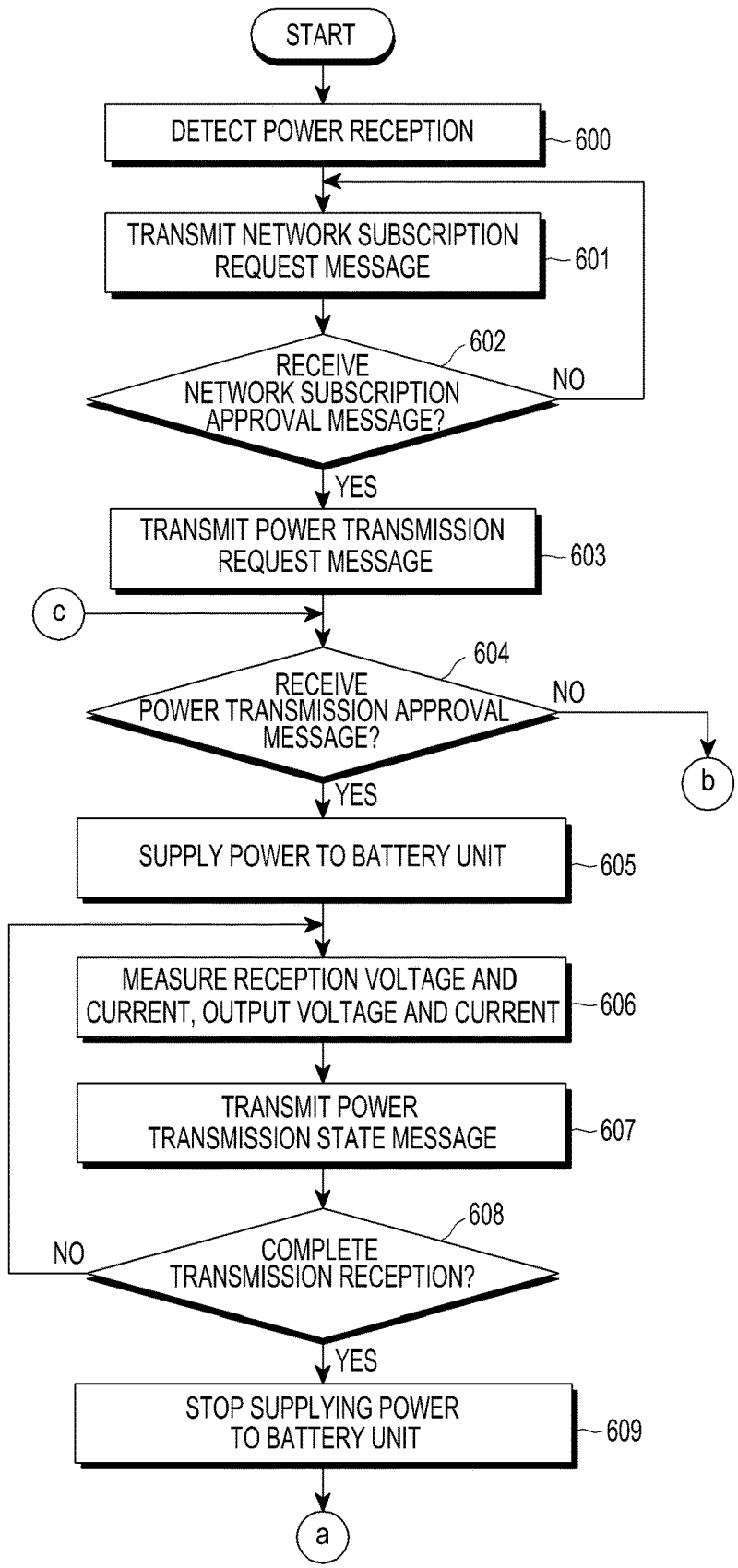
FIGS. 6 to 7 are flowcharts illustrating a process in which a power receiving apparatus performs wireless power transmission with a power transmitting apparatus according to an embodiment of the present invention.
Figure 7:
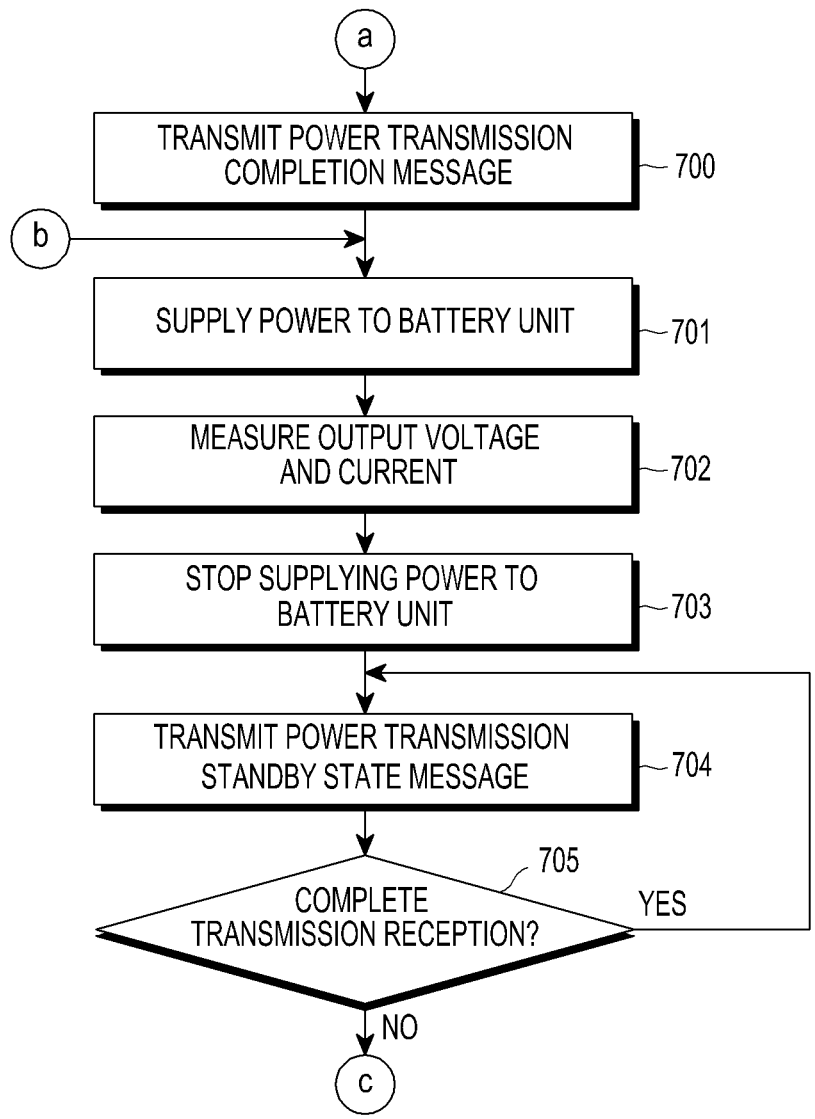

FIGS. 6 to 7 are flowcharts illustrating a process in which a power receiving apparatus performs wireless power transmission with a power transmitting apparatus according to an embodiment of the present invention.

Referring to FIG. 6, the controller 210 detects power reception in step 600. In step 601, the controller 210 generates a network subscription request message including the ID, the protocol version, and the reference load value of the power receiving apparatus for subscribing to the wireless multi-power transmission network and then transmits the generated network subscription request message to the power transmitting apparatus.

In step 602, the controller 210 determines whether the network subscription approval message is received from the power transmitting apparatus within the preset time.

If the network subscription approval message is received, the controller 210 transmits the power transmission request message to the power transmitting apparatus in step 603. However, if the network subscription approval message is not received from the power transmitting apparatus within the preset time, the controller 210 retransmits the network subscription request message to the power transmitting apparatus in step 601. For example, when the network subscription approval message is not received from the power transmitting apparatus, it may mean that a network subscription rejection message is received or no approval message is received.

In step 604, the controller 210 determines whether the power transmission approval message is received from the power transmitting apparatus within the preset time.

If the power transmission approval message is received, the controller 210 supplies power to the battery unit 250 by turning on the switch of the output terminal in step 605, and measures the reception voltage, the reception current, the output voltage, and the output current of the output terminal in step 606. In step 607, the controller 210 generates the power transmission state message including the measured output voltage, output current, reception voltage, and reception current, and then transmits the generated power transmission state message to the power transmitting apparatus.

In step 608, the controller 210 determines whether the power reception is completed. If the power reception is not completed, steps 606 to 608 are repeated. However, if the power reception is completed in step 608, the controller 210 stops supplying the power to the battery unit 250 by turning off the switch of the output terminal in step 609.

Referring to FIG. 7, in step 700, the controller 210 transmits the generated power transmission completion message to the power transmitting apparatus.

If the power transmission approval message is not received within the preset time in step 604, or after transmitting the generated power transmission completion message to the power transmitting apparatus in step 700, the controller 210 supplies the power to the battery unit 250 by turning on the switch of the output terminal in step 701 of FIG. 7.

The controller 210 measures the output voltage and the output current of the output terminal in step 702 and stops supplying the power to the battery unit 250 in step 703.

In step 704, the controller 210 transmits the power transmission standby state message including the measured output voltage and output current to the power transmitting apparatus.

In step 705, the controller 210 determines whether the power reception is completed. If the power reception is completed, the controller 210 transmits the power transmission standby state message to the power transmitting apparatus in step 704. Accordingly, the controller 210 can maintain the communication connection with the power transmitting apparatus by periodically transmitting the power transmission standby state message to the power transmitting apparatus.

However, if the power reception is not completed, the controller 210 determines whether the power transmission approval message is received from the power transmitting apparatus in step 604 of FIG. 6. Thereafter, steps 605 to 609 are performed.

Figure 8:
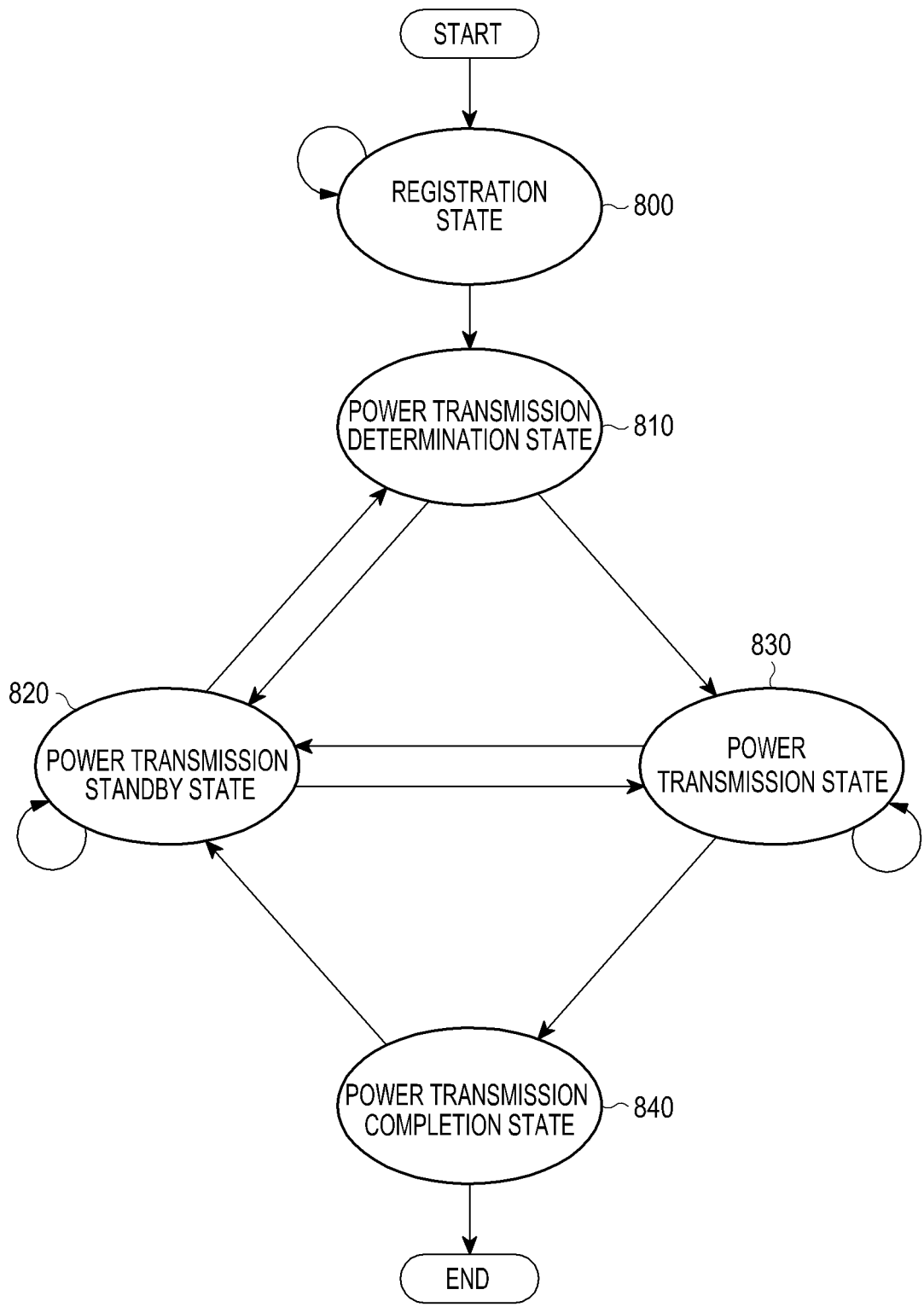
FIG. 8 is a diagram illustrating states of a power receiving apparatus according to an embodiment of the present invention.

FIG. 8 is a diagram illustrating states of a power receiving apparatus according to an embodiment of the present invention.

Referring to FIG. 8, the power receiving apparatus enters a registration state 800 for the wireless power transmission performed with the power transmitting apparatus. That is, the power receiving apparatus detects the power transmitted from the power transmitting apparatus, generates the network subscription request message including power transmission state information such as the ID, the protocol version, and the reference load value of the power receiving apparatus for the subscription to the wireless multi-power transmission network, and transmits the generated network subscription request message to the power transmitting apparatus.

If a network subscription approval message is received from the power transmitting apparatus, the power receiving apparatus enters a power transmission determination state 810 for waiting for a power transmission approval or a power transmission rejection from the power transmitting apparatus. That is, the power receiving apparatus transmits the power transmitting request message for requesting the power transmission to the power transmitting apparatus and waits to receive the power transmission approval message or the power transmission rejection message.

If the network subscription approval message is not received from the power transmitting apparatus or the network subscription rejection message is received from the power transmitting apparatus, the power receiving apparatus retransmits the network subscription request message to the power transmitting apparatus and remains in the registration state 800.

If the power transmission approval message is received from the power transmitting apparatus, the power receiving apparatus enters a power transmission state 830 for performing the power transmission with the power transmitting apparatus. That is, the power receiving apparatus receives the wireless power from the power transmitting apparatus.

If the power transmission approval message is not received from the power transmitting apparatus or the power transmission rejection message is received from the power transmitting apparatus, the power receiving apparatus enters a power transmission standby state 820. That is, the power receiving apparatus maintains communication without receiving the wireless power from the power transmitting apparatus. That is, the power receiving apparatus receives only power for the communication from the power transmitting apparatus.

The power receiving apparatus measures the output voltage and the output current and transmits the power transmission standby state message containing the measured output voltage and output current to the power transmitting apparatus. Then, if the power reception is not completed, the power receiving apparatus enters the power transmission determination state 810.

If the power receiving apparatus receives the power transmission approval message from the power transmitting apparatus in the power transmission standby state 820, the power receiving apparatus enters the power transmission state 830.

If the power reception is completed in the power transmission state 830, the power receiving apparatus enters a power transmission completion state 840. That is, the power receiving apparatus determines that the power transmission is completed and stops supplying the power to the battery unit after turning off the switch of the output terminal.

The power receiving apparatus transmits the power transmission completion message to the power transmitting apparatus in the power transmission completion state 840 and enters the power transmission standby state 820. In the power transmission standby state 820, the power receiving apparatus maintains the communication connection by periodically transmitting the power transmission standby state message to the power transmitting apparatus.

FIG. 9 illustrates an example of a power receiving apparatus management table according to an embodiment of the present invention.

Referring to FIG. 9, the power receiving apparatus management table includes fields for a Network ID, an ID, a reference load, a reference current, a reference voltage, a reference efficiency, a state, an input voltage, an input current, an output voltage, an output current, a transmission order, and a priority of a power receiving apparatus, for each power receiving apparatus managed in the table. Here, if the power receiving apparatus is located in the resonator of the power transmitting apparatus, based on an assumption that the power transmitting apparatus transmits prearranged regular power, the reference load refers to a value generated by quantizing a numerical value converted from the voltage or the current measured in the resonator of the power transmitting apparatus. Further, the reference efficiency refers to a quantized ratio of power transmitted by the power transmitting apparatus to power received by the power receiving apparatus when the power receiving apparatus receives sufficient power from the power transmitting apparatus so that the power transmission is normally performed. The reference voltage refers to a maximum voltage, which can be applied to the output terminal of the power receiving apparatus in an environment where the power receiving apparatus receives sufficient power from the power transmitting apparatus. The reference current refers to a maximum current, which can be applied to the output terminal of the power receiving apparatus in the environment where the power receiving apparatus receives sufficient power from the power transmitting apparatus. The transmission order refers to an order of power receiving apparatuses receiving power from the power transmitting apparatus, and the priority refers to an order preset between a plurality of power receiving apparatuses for the power reception.

For example, if a maximum transmission power value that can be transmitted by a power transmitting apparatus is 8 W and a transmission power value is 5 W, it is assumed that the controller 120 is transmitting a total of 4.2 W of power to power receiving apparatuses with Network IDs of 2, 3, and 4 as illustrated in FIG. 9. Further, the following description is based on an assumption that the power transmitting apparatus can transmit the power to 5 power receiving apparatuses in one network.

When the power receiving apparatus with the network ID of 1 newly subscribes to the network for the power transmission, if the power transmission request message is received from the power receiving apparatus with the network ID of 1, the controller 120 calculates the power value required by the power receiving apparatus using the reference voltage value, the reference current value, and the reference efficiency value included in the received power transmission request message. For example, when the reference current of the power receiving apparatus with the network ID of 1 is 300 mA, the reference voltage is 5 V, and the reference efficiency is 75%, a power value which the power receiving apparatus with the network ID of 1 can receive is 1.125 V. That is, the power receiving apparatus can receive only power of 1.125 V even though the power transmitting apparatus transmits power of 1.5 V based on the reference current and the reference voltage.

The controller 120 determines whether the value generated by adding the power value being transmitted by the power transmitting apparatus and the power value required by the power receiving apparatus is smaller than the maximum output value of the power transmitting apparatus. If the added value is smaller than the maximum output value, the controller 120 can transmit the power to the power receiving apparatus with the network ID of 1.

For example, when the power value being transmitted by the power transmitting apparatus is 4.2 V, the power value required by the power receiving apparatus is 1.5 V, and the maximum output power value of the power transmitting apparatus is 8 W, the controller 120 can transmit the power to the power receiving apparatus with the network ID of 1 because the value generated by adding the value of 4.2 V and the value of 1.5 V is smaller than 8 W.

Thereafter, the controller 120 transmits the power transmitting approval message to the power receiving apparatus with the network ID of 1 and transmits power of 1.5 V to the power receiving apparatus with the network ID of 1.

When the power receiving apparatus with the network ID of 1 and the power receiving apparatus with the network ID of 5 are newly subscribed to the network for the power transmission, if the power transmitting apparatus can transmit power to only one power receiving apparatus, the controller 230 can transmit the power to one power receiving apparatus desired to first receive the power with reference to the predetermined transmission order and priority between the two power receiving apparatuses. In this case, a power receiving apparatus having not received the power enters the power transmission standby state and transmits the power transmission standby state message to the power transmitting apparatus. Thereafter, when the power transmission of the power receiving apparatus currently receiving the power is completed, the power transmitting apparatus enables the power transmission to be performed by transmitting the power transmission approval message to the power receiving apparatus in the power transmission standby state.

For example, when the power receiving apparatus with the network ID of 5 has a priority of 4, the controller 120 can transmit the power transmission approval message to the power receiving apparatus with the network ID of 5 after the power transmission of power receiving apparatuses with network IDs of 2, 3, and 4 is completed.

The power transmitting apparatus and method according to the above-described embodiments of the present invention can stably transmit power to each power receiving apparatus by considering power transmission states of a plurality of power receiving apparatuses.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for wireless power transmission by a power transmitting apparatus, the method comprising:
   transmitting detection power;
   detecting an impedance change made by a power receiving apparatus;
   transmitting driving power for communication with the power receiving apparatus towards the power receiving apparatus;
   receiving, through a communication circuit, a search signal from the power receiving apparatus, the search signal including information regarding a reference load impedance;
   comparing the impedance change with the reference load impedance;
   in response to a difference between the impedance change and the reference load impedance being out of a first acceptable range, transmitting, through the communication circuit, a rejection message to the power receiving apparatus and stopping transmission of the driving power; and
   based on the difference between the impedance change and the reference load impedance being within the first acceptable range:
      transmitting wireless power towards the power receiving apparatus;
      receiving information regarding the power receiving apparatus;
      identifying a leakage power value of the power receiving apparatus based on the information regarding the power receiving apparatus;
      determining whether the leakage power value of the power receiving apparatus is within a second acceptable range; and
      stopping transmission of the wireless power towards the power receiving apparatus based on the leakage power value being out of the second acceptable range.

2. The method of claim 1, further comprising:
   in response to the difference between the impedance change and the reference load impedance being within the first acceptable range, transmitting an approval message to the power receiving apparatus.

3. The method of claim 1, further comprising:
   storing a power management table including state information for power transmission on at least one power receiving apparatus.

4. The method of claim 3, wherein the state information includes an Identifier (ID), reference load, reference current, reference voltage, reference efficiency, power transmission state, input voltage, input current, output voltage, and output current of the power receiving apparatus.

5. The method of claim 3, further comprising:
   receiving a state message from the power receiving apparatus; and
   determining a transmission power value using the stored power management table and the received state message.

6. A power transmitting apparatus for wireless power transmission, the power transmitting apparatus comprising:
   a resonator;
   a communication unit; and
   a controller configured to at least control to:
      transmit detection power through the resonator, detect an impedance change made by a power receiving apparatus, transmit driving power for communication with the power receiving apparatus, through the resonator, towards the power receiving apparatus, receive, through the communication circuit, a search signal from the power receiving apparatus, the search signal including information regarding a reference load impedance, compare the impedance change with the reference load impedance, in response to a difference between the impedance change and the reference load impedance being out of a first acceptable range, transmit, through the communication circuit, a rejection message to the power receiving apparatus and stop transmission of the driving power, and based on the difference between the impedance change and the reference load impedance being within the first acceptable range:
  transmit wireless power towards the power receiving apparatus,
  receive information regarding the power receiving apparatus.
  identify a leakage power value of the power receiving apparatus based on the information regarding the power receiving apparatus,
  determine whether the leakage power value of the power receiving apparatus is within a second acceptable range, and
  stop transmission of the wireless power towards the power receiving apparatus based on the leakage power value being out of the second acceptable range.

7. The power transmitting apparatus of claim 6, wherein the controller is further configured to control to, in response to the difference between the impedance change and the reference load impedance being within the first acceptable range, transmit an approval message towards the power receiving apparatus.

8. The power transmitting apparatus of claim 6, wherein the controller is further configured to control to store a power management table including state information for power transmission on at least one power receiving apparatus.

9. The power transmitting apparatus of claim 8, wherein the state information includes an Identifier (ID), reference load, reference current, reference voltage, reference efficiency, power transmission state, input voltage, input current, output voltage, and output current of the power receiving apparatus.

10. The power transmitting apparatus of claim 9, wherein the controller is further configured to control to:
  receive a state message from the power receiving apparatus, and
  determine a transmission power value using the stored power management table and the state message.

* * * * *